United States Patent
Lee

(10) Patent No.: US 7,494,282 B2
(45) Date of Patent: Feb. 24, 2009

(54) RADIAL FOIL BEARING

(75) Inventor: Heon Seok Lee, Daejeon (KR)

(73) Assignee: Kturbo, Inc., Buyong-Myeon, Chengwon-Gun, Chungbuk (KR)

( * ) Notice: Subject to any disclaimer, the term of this patent is extended or adjusted under 35 U.S.C. 154(b) by 324 days.

(21) Appl. No.: 10/597,957

(22) PCT Filed: Feb. 14, 2005

(86) PCT No.: PCT/KR2005/000400

§ 371 (c)(1),
(2), (4) Date: Aug. 14, 2006

(87) PCT Pub. No.: WO2005/078294

PCT Pub. Date: Aug. 25, 2005

(65) Prior Publication Data

US 2007/0183697 A1 Aug. 9, 2007

(30) Foreign Application Priority Data

Feb. 14, 2004 (KR) .................. 10-2004-0009869

(51) Int. Cl.
*F16C 32/06* (2006.01)
(52) U.S. Cl. .................................. 384/106
(58) Field of Classification Search .......... 384/103–106
See application file for complete search history.

(56) References Cited

U.S. PATENT DOCUMENTS

| | | | | | |
|---|---|---|---|---|---|
| 3,809,443 | A | * | 5/1974 | Cherubim | 384/106 |
| 3,893,733 | A | * | 7/1975 | Silver et al. | 384/106 |
| 4,005,914 | A | * | 2/1977 | Newman | 384/103 |
| 4,178,046 | A | * | 12/1979 | Silver et al. | 384/103 |
| 4,300,806 | A | * | 11/1981 | Heshmat | 384/103 |
| 4,465,384 | A | * | 8/1984 | Heshmat et al. | 384/106 |
| 4,624,583 | A | * | 11/1986 | Saville et al. | 384/105 |
| 4,654,939 | A | * | 4/1987 | Silver | 29/898.02 |
| 4,950,089 | A |   | 8/1990 | Jones | |
| 5,427,455 | A | * | 6/1995 | Bosley | 384/106 |
| 5,498,083 | A | * | 3/1996 | Brown | 384/106 |
| 5,584,582 | A |   | 12/1996 | Brown | |
| 5,634,723 | A | * | 6/1997 | Agrawal | 384/106 |
| 5,866,518 | A | * | 2/1999 | Dellacorte et al. | 508/104 |
| 5,911,511 | A | * | 6/1999 | Saville | 384/106 |
| 5,915,841 | A | * | 6/1999 | Weissert | 384/104 |
| 5,988,885 | A |   | 11/1999 | Heshmat | |
| 6,024,491 | A | * | 2/2000 | Bak | 384/106 |
| 6,190,048 | B1 | * | 2/2001 | Weissert | 384/103 |

FOREIGN PATENT DOCUMENTS

KR    2002-0067790 A    8/2002

* cited by examiner

*Primary Examiner*—Thomas R Hannon
(74) *Attorney, Agent, or Firm*—Joseph Hyosuk Kim; JHK Law

(57) ABSTRACT

The present invention provides a radial foil bearing for supporting a high-speed rotating shaft. The radial foil bearing comprises a top foil (1): a key (2) welded to a cut portion of the top foil; an inner bump coil (3) disposed outwards of the top foil, the inner bump being formed of a wider and higher bump and a narrower and lower bump alternately arranged; an outer bump foil (4) disposed outwards of the inner coil, the outer bump having a height lower the that of the narrower and lower bump of the inner bump foil; a bump sheet (5) for fixing the inner bump and the outer bump; and a bearing housing (6) disposed outwards of the bump sheet and having a key groove (7).

2 Claims, 4 Drawing Sheets

[Fig. 1]
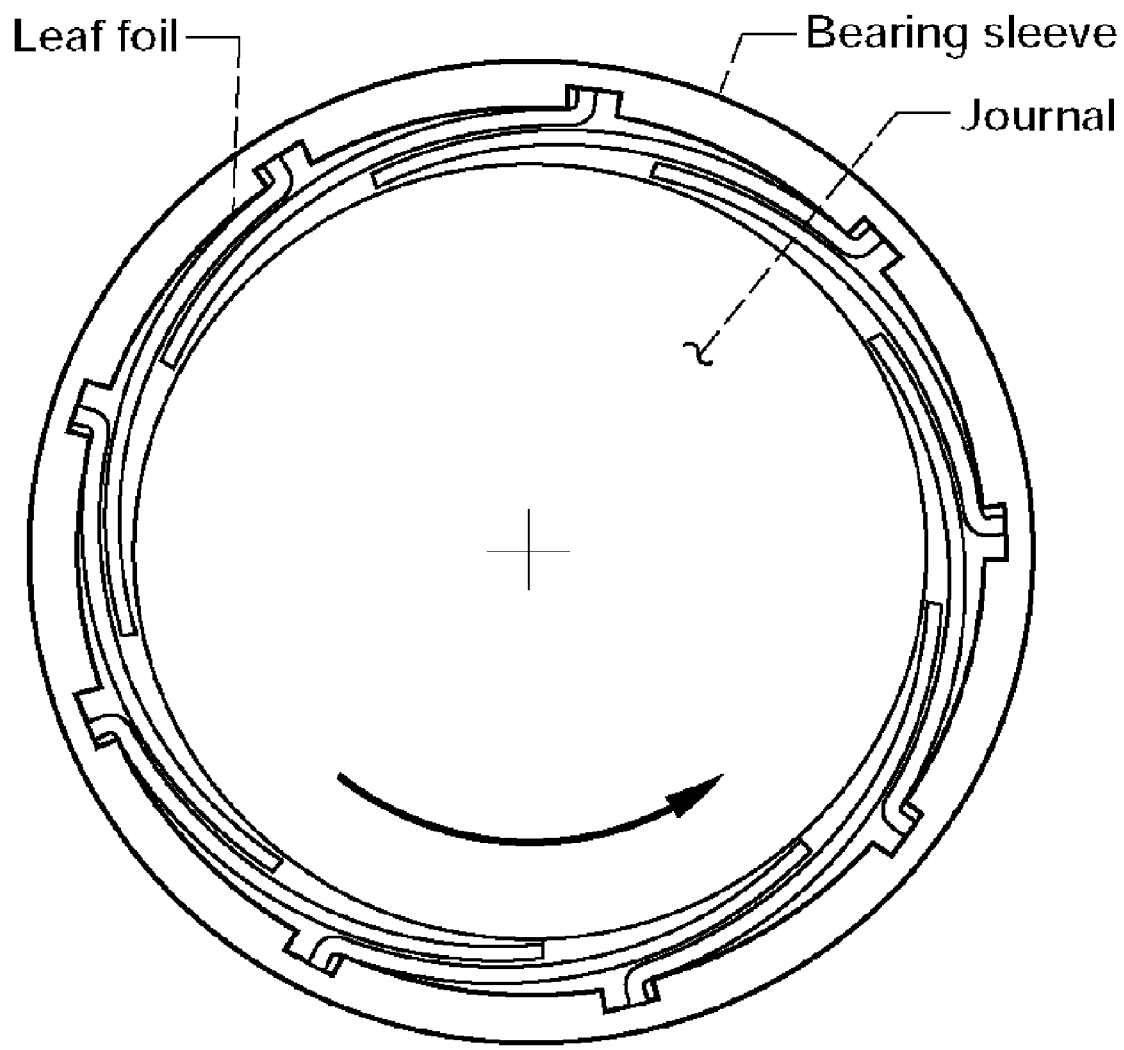
Prior Art

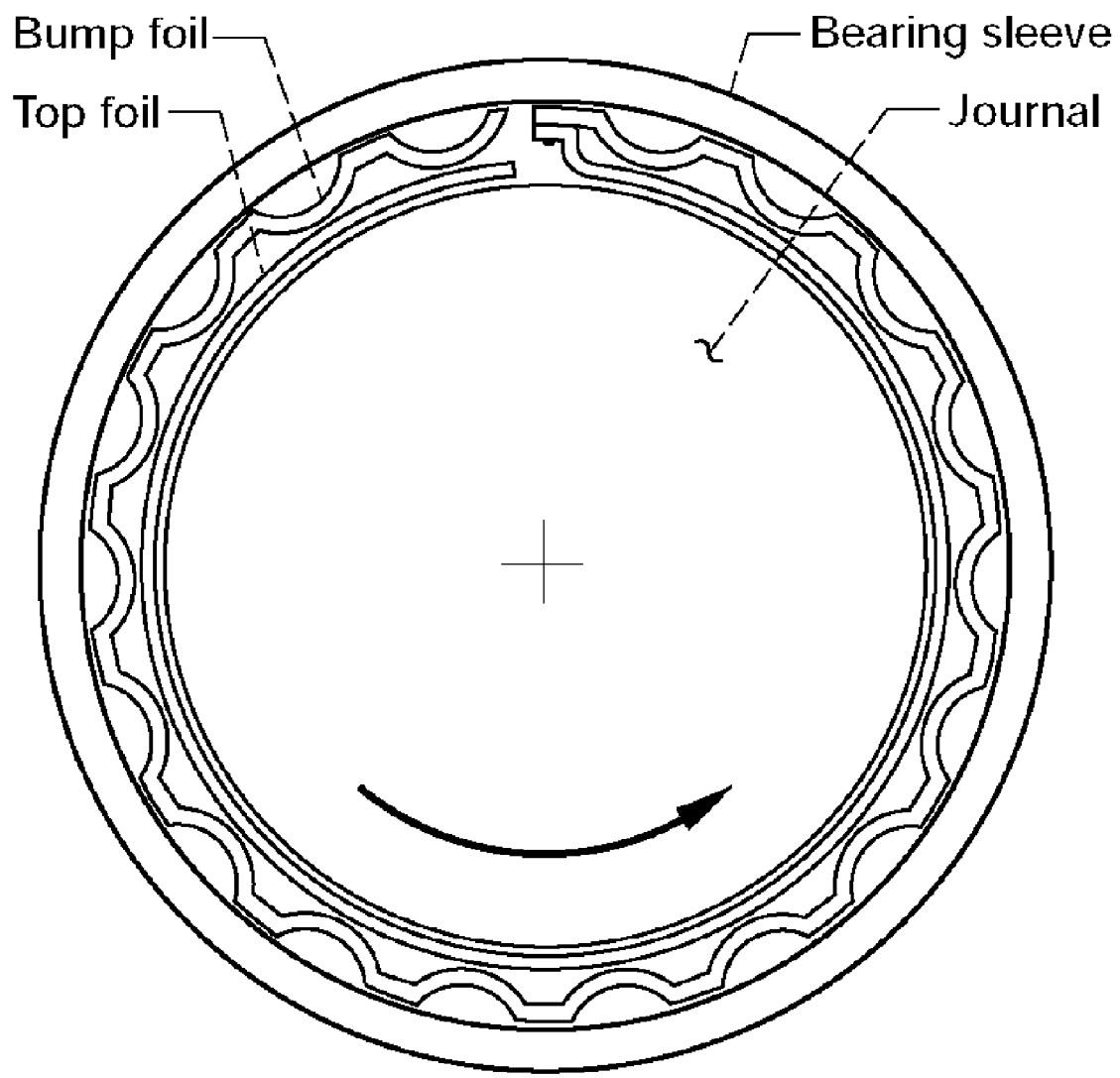
[Fig. 2]
Prior Art

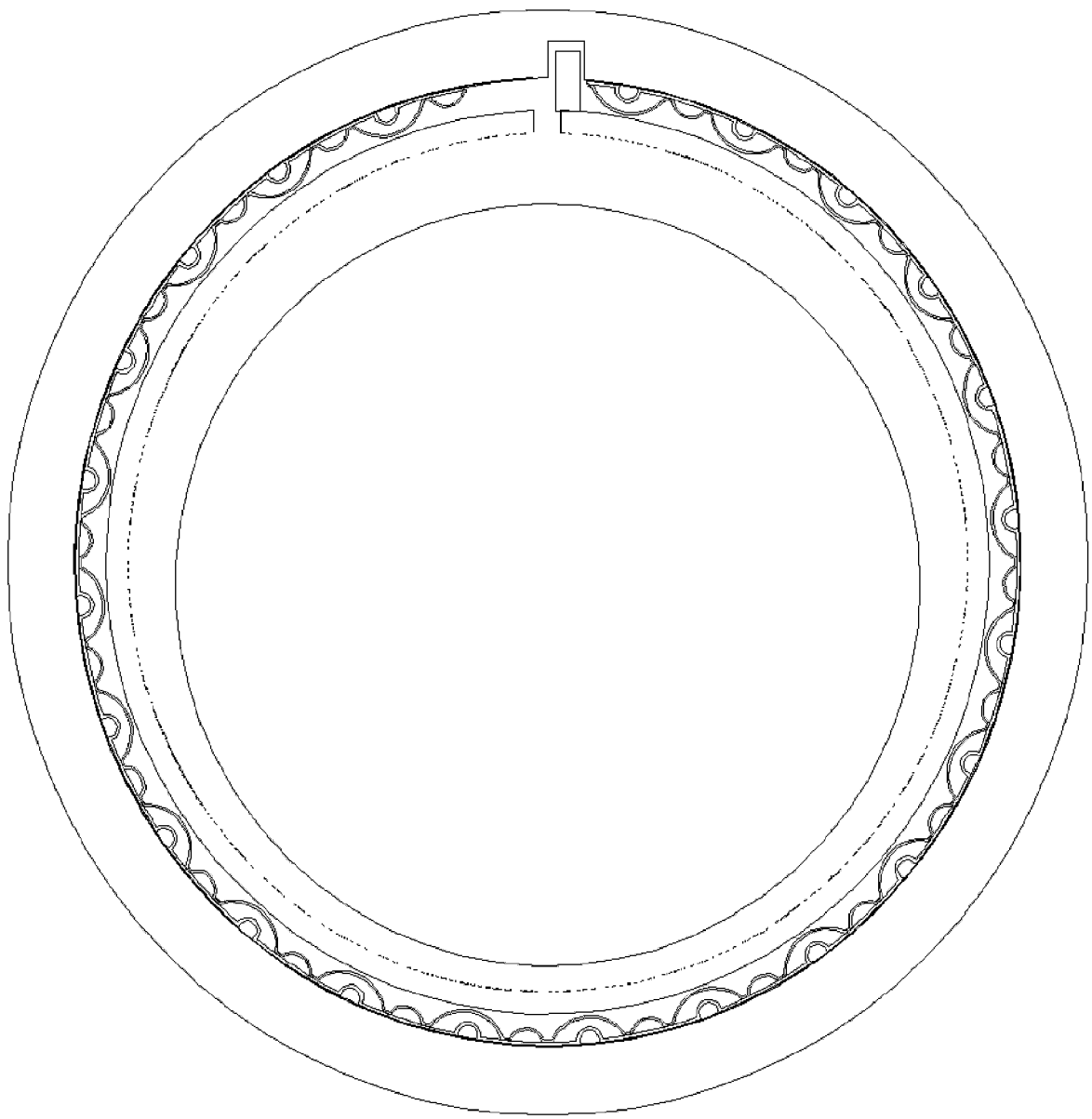
[Fig. 3]

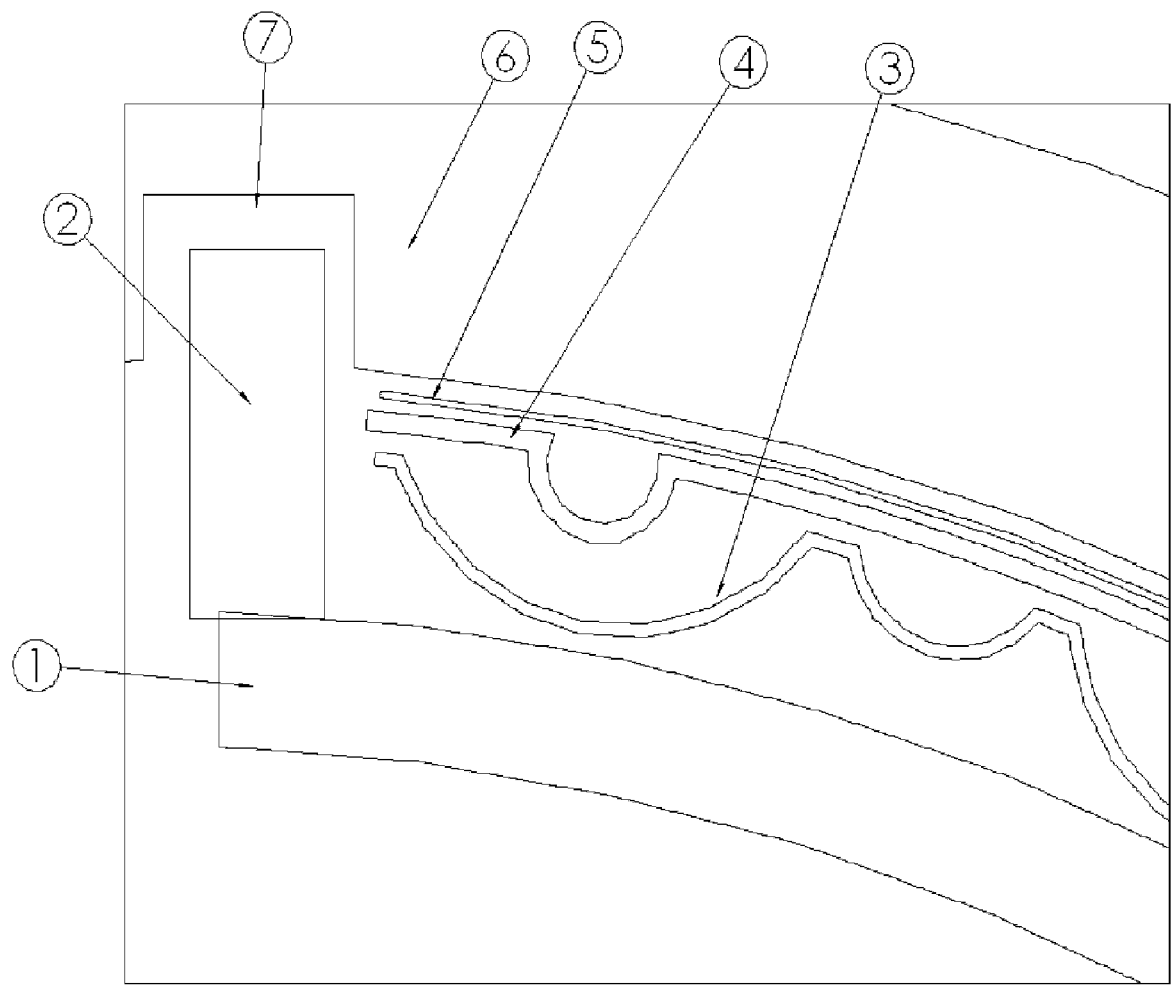
[Fig. 4]

RADIAL FOIL BEARING

TECHNICAL FIELD

The present invention relates to a radial foil bearing.

BACKGROUND ART

A bearing is generally classified into a rolling bearing (using a ball or a roller), an oilless bearing (using a lubricant material for a frictional operation), a sliding bearing (using an oil), a gas bearing, and a magnetic bearing (using magnetic force for a contactless operation). The sliding bearing is divided into a hydrodynamic sliding bearing and a hydrostatic sliding bearing. The hydrodynamic sliding bearing supports a shaft using an oil pressure generated by a relative sliding motion. The hydrostatic sliding bearing supports a shaft using high-pressure oil supplied from the exterior of the bearing. The gas bearing is operated in the same manner as in the sliding bearing, excepting that gas is used instead of oil. The hydrostatic gas bearing is supplied with a compressed gas from the external source, and in the hydrodynamic gas bearing the pressure is generated by a relative sliding motion.

The hydrodynamic gas bearing is widely used in the high-speed rotation applications, due to its low friction loss and unnecessity of liquid lubricant. In particular, it is used commonly in case of superspeed applications where the rolling bearing cannot be used for supporting and in case where a liquid lubricant cannot be easily used. The hydrodynamic gas bearing is categorized into a grooved bearing, a tilting pad bearing, and a foil bearing. The grooved bearing has a groove for generating a pressure, and exemplified by a spiral grooved bearing. In the case the hydrodynamic fluid-film tilt pad bearing, its working condition is very restricted and thus a risk of failure is increased disadvantageously if beyond the working condition. For example, since the rigidity thereof is rapidly decreased when above or below the design criteria, this bearing is very susceptible to impact, misalignment of a shaft, and thermal deformation. In contrast, a foil bearing called a compliant hydrodynamic fluid-film bearing provide a very high performance, and a rapid progress has been made recent 20 years. In addition, its adequate durability and stability has been confirmed in the air conditioning device of airplanes. In particular, it has been employed in a high-speed rotation machine such as a high-speed cryogenic turbo-compressor of 100,000 rpm. This bearing can be used with minute liquid mixed and its flexibility and the possibility of lower price are their advantages. The foil bearing for airplanes has been used mainly since 1970 in the air cooling machine (ACM), which is a core component for controlling the temperature and pressure inside the cabin in the environmental control system (ESC). This can be considered as a most suitable example of use. In this application, the foil bearing does not contaminate the interior of the cabin because it does not have any oil system. Also, it has enabled a stable operation for a long time, without scheduled maintenance, as compared with a ball bearing. When failed, advantageously it does not lead to the failure of other turbo-components. The foil bearing used in Boeing 747 has been being operated more than 100,000 hours, without any repair.

DISCLOSURE OF INVENTION

Technical Problem

The foil bearing is generally divided into two types, i.e., a leaf type and a bump type. As shown in FIG. 1, in the leaf type foil bearing, plural vane-shaped foils are disposed in the direction of rotation with adjacent foils partially overlapped, in which a shaft is to be supported. As shown in FIG. 2, the bump type foil bearing is provided with a single foil formed in its entirety, and the foil is supported by a spring provided around it. The leaf type foil bearing is suitable to the case where support load is lower and external impact is small, and the starting torque thereof is large advantageously. In contrast, the bump type brings out a small load when staring, and has a good durability and rigidity. However, since it has a complicated design and production condition, and in particular the stability thereof cannot be easily secured, only 2 or 3 companies hold the technology worldwide. A bearing housing is provided with a bump foil welded to the inner side thereof, and the bump foil serves as a spring. Inwards thereof, a top foil is welded to the bearing housing and the top foil is practically contacted with the shaft. When the shaft rotates while drawing the air, the top foil and the bump foil is deformed such that a space for forming a fluid film is provided. In the foil bearing, the geometrical structure for forming a fluid film is provided by the elastic deformation of the top foil. As the rotation frequency increase, the bump foil is pushed outwards and the shaft is off out of its center, thereby forming a space having the form of a converging wedge. At this time, using the deforming property of the top foil, an optimum structure capable of generating a suitable dynamic pressure can be designed without necessity of a complicated machining process. In addition, since margin is formed in a diametrical direction, advantageously, it can respond properly to the increase in the shaft diameter due to a high-speed rotation. These characteristics rely upon the thickness of the top foil and the bump structure supporting the top foil. In particular, the bump foil design is to determine whether the rigidity and damping required for a shafting can be provided or not. Therefore, the structure, the thickness, the height, the pitch, the number of the bump foil or the like is critical factors to determine the performance of a bump type foil bearing.

Furthermore, a military-purpose bearing needs a capability of enduring a higher speed of rotation, and a severe environment and impact. In practice, these requirements for a high speed, high-output and high efficiency BLDC motor can not be met by a common oil lubricant bearing. In addition, it must endure structurally and adequately a misalignment, heat and vibration. In order to obtain a maximum supporting power for these purposes, it is known to be beneficial that the bump foil is divided along the axial and rotational direction.

The relevant patent is U.S. Pat. Nos. 4,300,806, 5,915,841, 5,988,885, 4,465,384, 5,498,083, 5,584,582, 6,024,491, 6,190,048B1, 4,624,583, 3,893,733, 3,809,443, 4,178,046, 4,654,939, 4,005,914, 5,911,511, 5,634,723, 5,427,455, and 5,866,518.

The fundamental principle therefor has been patented in 1970s. Modification to the bump and top foils has been made in order to enhance the performance thereof. The U.S. Pat. No. 5,866,518 discloses an attempt to develop a metallic dry lubricant, which can be applied a high-temperature applications and has a good adhesive property.

Technical Solution

The present invention relates to a bump type foil bearing, which has an improved performance, along with an improved productivity. Here, the performance means a supporting capacity and stability. Even though it has a good supporting ability, it cannot be readily employed without an appropriate stability. Also, even if it provides stability, it cannot be used in practice without an adequate supporting power. FIGS. 1 and 2 shows a typical bearing, which has been commonly used. It is known that the bump type bearing has a supporting ability more than two times of that of the leaf type, but embraces a difficulty in securing stability and thus it has not been easy to develop a higher performance bearing.

Furthermore, the invention relates to a bump type foil bearing, in which a good supporting power and stability can be secured, thereby providing a practical bump type foil bearing. Also, in the assembling of the bearing, the production rate is disadvantageously decreased due to the precision therefor. It has a structural difficulty in that at the elevated temperature (below 400° C.), it must be adequately cooled and thus the whole system efficiency is degraded due to its cooling. At the ultrahigh temperature (below 800° C), a metallic lubricant must be used. Therefore, a material having a good adhesiveness must be developed in order to apply to the shaft. The characteristic of the lubricant is restricted and it causes a higher coating cost.

Therefore, it is an object of the invention to improve the load supporting capacity while providing a high productivity, to provide a wide stable range so as to be operated with a higher stability at a high speed and high temperature. A further object of the invention is to enhance significantly its price and performance by using a coating material having a low adhesiveness.

DESCRIPTION OF DRAWINGS

Further objects and advantages of the invention can be more fully understood from the following detailed description taken in conjunction with the accompanying drawings, in which:

FIG. 1 shows a conventional leaf type radial foil bearing;

FIG. 2 shows a conventional bump type radial foil bearing;

FIG. 3 illustrates a radial foil bearing according to one embodiment of the invention; and FIG. 4 is a partially enlarged view of the radial foil bearing in FIG. 3.

BEST MODE

The preferred embodiments of the present invention will be hereafter described in detail with reference to the accompanying drawings.

A bump foil bearing according to one embodiment of the invention is a general type of bearing as shown in FIG. 2. The bump foil bearing of the invention comprises a top foil (1), a key (2), an inner bump foil (3), an outer bump foil (4), a bump sheet (5), a housing (6), and a key groove (7).

A fine gap exists between the shaft and the top foil (1). The surrounding air or gas serves as a lubricant oil. The top foil (1) exhibit another form rather than a circle, due to a pressure caused by the air flow generated from the rotation speed of the shaft, thereby further increasing its supporting force. Therefore, the rigidity of the bump foils (3) and (4) and the thickness of the top foil (1) is of importance in determining the supporting force thereof. The behavior of the bump foil, which supports the top foil (1), determines the supporting power and stability. In addition, the performance relies upon the characteristics of the bump foils (3) and (4), which supports the top foil (1). Therefore, the present invention is intended to improve the performance and economical efficiency by changing the structure of the bump foils (3) and (4) and the top foil (1).

The thickness of the top foil is made to be adequately thicker than the conventional case (0.1t in case of a bearing having a diameter of 60 mm), such that a lathe machining and an inner diameter grinding can be performed. Therefore, the productivity and the p recision can be improved, and the shape of the bearing can be maintained at a lower rotation speed so that the frictional load can be alleviated to thereby reduce its wearing-out. Also, the high-temperature distortion can be decreased to thereby reduce the extent to be cooled. That is, the thickness of the top foil (1) is made to become above $$t \geq 0.1 \cdot D^{0.33}$$

(t: the thickness (mm), D: the diameter of the shaft (mm)), so that the performance and productivity therefore are enhanced. In addition, the inner diameter grinding of the top foil can be carried out. Therefore, in case where a metallic dry lubricant is used, the lubricant is sprayed in the inner diameter of the top foil using a plasma melt-spraying process, or the like and then ground, thereby avoiding a difficulty that a dry lubricant having a strong adhesiveness must be developed and sprayed in the outer diameter of the shaft, which is then ground. In this way, in order to achieve a high performance by making the top foil (2) thicker, a bump foil having a good characteristic in a wide range of load must be used together.

The bump foils (3), (4) to be used together with the thicker top foil (1) can transfer the load uniformly to the top foil (1), even in case where the number thereof is low (the pitch thereof is large). Therefore, a high inner bump foil and a low inner bump foil are alternately disposed in such a way that the outer bump foil (4) is placed under the high inner bump foil (3) only. Consequently, it can have a three-step variation effect of rigidity, although a two-layer structure is used. As the bump foil is pressed, the rigidity does not vary linearly. That is, its structure is configured such that the rigidity can be increased in the form of an equation of the second or third degree, thereby providing stability in a wide range of rotation frequency.

The inner bump (3) is formed of a higher one and a lower one alternately arranged. Thus, as the top foil is pressed, the rigidity is increased in a two-step fashion. As the top foil (1) is further pressed, the outer bump foil (4) is also pressed so that the rigidity can be increased in a three-step mode. The height of the outer bump foil (4) is similar to the lower one of the inner bump foil (3), and thus the thickness can be increased in order to increase the rigidity thereof.

INDUSTRIAL APPLICABILITY

As described above, the rigidity of the bump foils (3) and (4) is varied in a three-step way so that a high and low load can be supported. Due to the damping effect caused by the rigidity and the three-step unlinearity of rigidity, stability can be secured, thereby enabling the operation near the critical speed. The outer bump foil (4) is disposed at the larger pitch of the inner bump foil (3) so that the assembling precision can be lowered and the number of processes for assembling to the inner diameter of the housing (6) can be reduced, thereby enhancing productivity. Since the top foil has a thick thickness, it can be used up to the critical temperature, thereby improving the efficiency thereof. It is because the rigidity of the thick foil itself eliminates the high-temperature distortion, and thus cooling is not or less required. In consequence, the present invention overcomes the disadvantages in the prior art that the convention foil bearing is expensive, cannot be mass-produced, and cannot be easily applied to a high-temperature application. Thus, according to the invention, the foil bearing can be used widely in the industrial or civilian machines.

Another advantage by the thicker top foil is that the top foil itself can maintain its shape, and thus the top foil and the bump foil does not need to be welded directly to the housing, thereby providing a simplified structure. The inner bump foil (3) and the outer bump foil (4) are simply spot-welded to the bump sheet (5), which then only has to be assembled to the housing (6), along with the top foil (1). Simply, the key (2) is welded and fixed to the top foil (1) and the housing (6) has a key groove (7) in order to prevent its rotation. Consequently, the difficulty in the conventional one, where all the components must be welded to the inner diameter of the housing (6), is overcome, thereby increasing productivity.

A strong point of the thicker top foil is that a small starting torque is exerted. Since the form of the bearing is maintained from the starting, due to a low friction the load when starting is low, thereby extending the service life of the bearing.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A radial foil bearing comprising:
   a) a top foil satisfying condition represented by an equation $t>0.1 \cdot D^{0.33}$, wherein t is the thickness (mm) and D is the diameter (mm) of a shaft;
   b) a key welded to a cut portion of the top foil;
   c) an inner bump foil disposed outwards of the top foil, the inner bump being formed of a wider and higher bump and a narrower and lower bump alternately arranged;
   d) an outer bump foil disposed outwards of the center of the wider and higher bump of the inner bump foil, the outer bump having a height lower than that of the narrower and lower bump of the inner bump foil;
   e) a bump sheet for fixing the inner bump and the outer bump; and
   f) a bearing housing disposed outwards of the bump sheet and having a key groove.

2. The radial foil bearing according to claim 1, wherein the inner diameter of the top foil is coated with a metallic dry lubricant, and then ground, so that a dry lubricant not requiring a strong adhesiveness can be used.

* * * * *